(12) United States Patent
Leisner et al.

(10) Patent No.: US 7,735,425 B2
(45) Date of Patent: Jun. 15, 2010

(54) CONVEYOR SYSTEM WITH A CONVEYOR CARRIAGE WITH AXIALLY ALIGNED TRACK ROLLERS

(75) Inventors: Ernst Leisner, Ludwigsburg (DE); Volker Porzer, Baltmannsweiler (DE); Peter Ludwig, Tuebingen (DE)

(73) Assignee: Bosch Rexroth AG, Stuttgart (DE)

( * ) Notice: Subject to any disclaimer, the term of this patent is extended or adjusted under 35 U.S.C. 154(b) by 628 days.

(21) Appl. No.: 11/168,072

(22) Filed: Jun. 28, 2005

(65) Prior Publication Data

US 2005/0284326 A1 Dec. 29, 2005

(30) Foreign Application Priority Data

Jun. 29, 2004 (DE) ................. 10 2004 031 443

(51) Int. Cl.
*B61B 12/02* (2006.01)
(52) U.S. Cl. ........................................ 104/96
(58) Field of Classification Search ............ 104/91, 104/93, 106, 107
See application file for complete search history.

(56) References Cited

U.S. PATENT DOCUMENTS

| | | | |
|---|---|---|---|
| 2,929,484 A | 3/1960 | Longdon | |
| 3,407,919 A | 10/1968 | Sandefur | |
| 3,646,656 A | 3/1972 | Zilahy et al. | |
| 3,717,102 A | 2/1973 | Lott et al. | |
| 3,777,669 A | 12/1973 | Lott et al. | |
| 3,902,432 A * | 9/1975 | Shortridge et al. | 105/150 |
| 4,081,071 A | 3/1978 | Nielsen | |
| 4,331,229 A | 5/1982 | Kamm | |
| 4,648,777 A | 3/1987 | Eichenauer | |
| 4,715,286 A | 12/1987 | Parker et al. | |
| 4,724,951 A | 2/1988 | Shinkawa et al. | |
| 4,991,516 A | 2/1991 | Rixen et al. | |
| 5,327,836 A | 7/1994 | Christ et al. | |
| 5,465,826 A | 11/1995 | Noestheden | |
| 5,473,880 A | 12/1995 | Leupers et al. | |
| 5,718,320 A | 2/1998 | Marquier et al. | |
| 5,960,938 A | 10/1999 | Clopton | |
| 6,019,214 A | 2/2000 | Herronen et al. | |
| 6,062,378 A | 5/2000 | Clopton | |

(Continued)

FOREIGN PATENT DOCUMENTS

CH 669 167 2/1989

(Continued)

*Primary Examiner*—S. Joseph Morano
*Assistant Examiner*—Robert J McCarry, Jr.
(74) *Attorney, Agent, or Firm*—Michael J. Striker

(57) ABSTRACT

A conveyor system (10) includes a conveyor course (12), which has a curved portion and two tracks (22, 24) located one above the other, and a conveyor carriage (14); each of the tracks (22, 24) is assigned at least one horizontal track roller (34, 36) of the conveyor carriage (14), and at least one of the tracks (22, 24) is assigned a further horizontal track roller (34, 36), which is spaced apart in the conveying direction (L) from the one track roller (34, 36) associated with the same track (22, 24). The axes of rotation (A, B) of the two track rollers (34, 36) are located in alignment with one another; and, whenever both tracks (22, 24) are each assigned a further track roller (34, 36), the axes of rotation (A, B) of these further track rollers (34, 36) are likewise in alignment with one another.

35 Claims, 6 Drawing Sheets

U.S. PATENT DOCUMENTS

| | | | |
|---|---|---|---|
| 6,131,726 | A | 10/2000 | Hovsto et al. |
| 6,237,755 | B1 | 5/2001 | Clopton |
| 6,502,691 | B2 | 1/2003 | Akatsuka et al. |
| 6,533,102 | B2 | 3/2003 | Franzoni et al. |
| 6,533,106 | B1 | 3/2003 | Lykkegaard |
| 6,889,816 | B2 | 5/2005 | Willing |

FOREIGN PATENT DOCUMENTS

| | | |
|---|---|---|
| DE | 1 147 893 | 4/1963 |
| DE | 1 274 993 | 8/1968 |
| DE | 2 356 067 | 5/1974 |
| DE | 24 45 601 | 3/1975 |
| DE | 26 40 593 | 6/1977 |
| DE | 32 31 510 | 3/1984 |
| DE | 35 05 640 | 8/1986 |
| DE | 89 06 203 | 9/1989 |
| DE | 42 21 366 | 1/1994 |
| DE | 295 16 558 U1 | 1/1996 |
| DE | 19517276 | 11/1996 |
| DE | 41 21 366 C2 | 1/1997 |
| DE | 297 22 233 U1 | 3/1998 |
| DE | 297 18 307 U1 | 4/1998 |
| DE | 197 37 351 A1 | 3/1999 |
| DE | 298 03 496 U1 | 8/1999 |
| DE | 298 23 526 U1 | 9/1999 |
| DE | 298 23 766 U1 | 1/2000 |
| DE | 100 05 646 A1 | 8/2001 |
| DE | 20 2004 001 810 | 4/2004 |
| EP | 81/003393 | 2/1981 |
| EP | 0 109 459 | 5/1984 |
| EP | 0123173 | 10/1984 |
| EP | 0 367 972 | 5/1990 |
| EP | 0 630 833 | 12/1994 |
| EP | 0 659 624 | 6/1995 |
| EP | 1 044 148 | 10/2000 |
| EP | 1 344 701 | 9/2003 |
| EP | 1 418 140 | 5/2004 |
| EP | 1 426 312 | 6/2004 |
| FR | 1 526 521 | 5/1968 |
| FR | 2 725 428 | 4/1996 |
| GB | 1 086 293 | 10/1967 |
| GB | 1 272 263 | 4/1972 |
| JP | 59-212309 | 12/1984 |

* cited by examiner

CONVEYOR SYSTEM WITH A CONVEYOR CARRIAGE WITH AXIALLY ALIGNED TRACK ROLLERS

BACKGROUND OF THE INVENTION

The invention relates to a conveyor system, including a conveyor course, which has at least one curved portion with an axis of curvature and a radius of curvature, in which a conveying direction or longitudinal direction pointing along the conveyor course, a upright direction extending parallel to the axis of curvature, and a crosswise direction extending orthogonally to both the conveying direction and the upright direction, may be associated with this conveyor course, and in which the conveyor course moreover has two tracks, one above the other in the upright direction and extending at a predetermined spacing from one another; and furthermore including a conveyor carriage having at least three rollers, in which at least one track roller having an axis of rotation extending substantially in the upright direction is assigned to each of the tracks, and in which at least one of the tracks is assigned a further track roller with an axis of rotation extending substantially in the upright direction, which axis is spaced apart in the conveying direction from the one track roller associated with the same track.

Already at this point, the term "upright direction", but also the other orientation indications maintain their validity even if the conveyor course extends at a predetermined angle to the horizontal. In that case, the "upright direction" will also not run exactly in the direction of the vertical but rather will form the predetermined angle with it. It should also be remembered that the conveying direction, in curved portions of the conveyor course, extends in the direction of the tangent to the particular place on the conveyor course in question.

A generic conveyor system is known for instance from U.S. Pat. Nos. 5,960,938, 6,062,378, and 6,237,755 B1. The known conveyor system includes a conveyor course, embodied as a profile girder, with a first roller track, whose surface is inclined to the horizontal by a slight angle, so that it can absorb the support load of the conveyor carriage that is transmitted from support rollers. Moreover, two further roller tracks are provided, of which one extends substantially vertically and the other forms a slight angle with the vertical. Via these two roller tracks, track rollers transmit the torque, exerted by a load applied to the conveyor carriage laterally, to the conveyor course. The two further roller tracks are spaced apart from one another not only in the upright direction of the conveyor course but also in the crosswise direction. Overall, the conveyor carriage has two such roller triplets, which are spaced apart from one another in the longitudinal direction of the conveyor course.

In practice, it has been found that the conveyor carriage of this known conveyor experience problems when traveling through curved portions of the conveyor course, and especially when cornering. Specifically, these problems increase all the more, the greater the curvature of the curved portion of the course, that is, the tighter the curve. As will readily be appreciated, it is precisely the tightest possible curve radius that is definitive for how much installation space must be made available for a conveyor system.

Solely for the sake of completeness, U.S. Pat. Nos. 3,646, 656 and 4,331,229 may be mentioned.

SUMMARY OF THE INVENTION

By comparison, it is the object of the present invention to furnish a conveyor system of the type defined at the outset, in which the conveyor carriage can travel around even tight and extremely tight curves of the conveyor course without problems.

This object is attained according to the invention by a conveyor system of the above-described type, in which the axes of rotation of the two track rollers are located in alignment with one another; and, whenever both tracks are each assigned a further track roller, the axes of rotation of these further track rollers are likewise located in alignment with one another. Because of the aligned location of the axes of rotation of the track rollers, the track rollers always travel over the same radius not only in wide curves but also in tight curves.

As has already been indicated above in the discussion of the prior art, the surfaces of the tracks extend substantially in the upright and conveying directions; that is, the surface normals of these two tracks extend essentially in the crosswise direction, and specifically they preferably point in opposite directions from one another. In this way, it is possible via the track rollers to transmit a torque to the conveyor course that originates in a load located laterally on the conveyor carriage. In addition, at least one support roller may be provided, which preferably has an axis of rotation extending substantially in the crosswise direction, and is in rolling engagement with a roller track (surface normal in the upright direction) extending substantially in the crosswise direction and the conveying direction. Via this support roller, the weight of the load and of the conveyor carriage can be transmitted to the conveyor course. The at least one support roller of one of the track rollers may be embodied as a trailing roller.

If the axis of rotation of the support roller is pivotable about an axis extending substantially in the upright direction, preferably substantially parallel to the axis of rotation of the associated track roller, then the support roller automatically positions itself at a tangent to the curvature of the curved portion, which leads to a reduction in wear on the surface of the support roller. To make it possible if needed to reverse the direction of motion of the conveyor carriage along the conveyor course, the support roller may be dimensioned such that it can pivot 360° on the roller track assigned to it.

A design is compact in view of the installation space required and that also makes it possible to give the conveyor carriage a visually attractive appearance can be attained for instance by providing that the support roller is dimensioned so that it is capable of being located in the upright direction, such that it is substantially completely below the track roller assigned to it.

At least one of the rollers, for instance, may be embodied as a disk-type roller, that is, as a roller with an axis of rotation which is fixed relative to the roller body and which is supported rotatably in a corresponding higher-order bearing. In addition or alternatively, however, it is also possible that at least one of the rollers is embodied as a ball roller. In that case, the axis of rotation automatically adjusts itself as a consequence of the rolling engagement between the ball roller and the associated roller track. The ball roller body, for instance, may be supported in a corresponding pan body. If the support roller is embodied as a ball roller, then the aforementioned pivotable arrangement is unnecessary, because of the self-adjustment of the axis of rotation, which makes possible a space-saving arrangement of the support roller. In particular, whenever the conveyor carriage has two pairs of track rollers that are spaced apart from one another in the conveying direction, the support rollers need not be located outside the two pairs of track rollers, regardless of the travel direction of the conveyor carriage along the conveyor course. For instance, the ball roller may be in axial alignment with the two track rollers of one pair of track rollers.

In the case of a support roller embodied as a disk-type roller, the 360°-pivotability, with the support roller simultaneously located below the associated track roller in terms of the upright direction, can be assured by providing that the support roller has approximately half the diameter of the associated track roller.

Experiments have surprisingly shown that the surface of at least one track is formed of lightweight metal or a lightweight metal alloy, preferably aluminum or an aluminum alloy, such as anodized aluminum, while the surface of at least one track roller is formed of a plastic, such as polyurethane, whose hardness preferably does not exceed 100 Shore A; less wear results than in the conventional case, in which the roller surface is of a hard plastic, such as cast polyamide, and the running surface is of steel. In the latter, conventional case, the steel track surface must furthermore be provided as a separate part, since the conveyor course is typically made of a lightweight metal or lightweight metal alloy, preferably aluminum or an aluminum alloy. According to the invention, these separate steel track surfaces can be dispensed with. Since this advantage is of interest also whenever the axes of rotation of the two track rollers are not in alignment with one another, independent patent protection is sought for this combination of characteristics.

In a refinement of the invention, it is proposed that the two tracks are formed on track units that are embodied separately from one another. As a result, it is possible for one and the same conveyor system to be adapted to the loading in a particular application. As mentioned above, via the track rollers, the torque of the load provided laterally on the convey or carriage is transmitted to the conveyor course. The load that the track rollers must withstand in the process depends on their spacing. Increasing this spacing makes it possible to increase the useful load transported on the conveyor carriage, with no change in the stress on the track rollers. This increase in spacing is made possible by the embodiment of the two tracks on separate track units. The two track units may be assigned to one common higher-order mounting unit, such as vertical support elements, which stand upright on the floor of an assembly hall or the like.

As is known per se from the prior art, the conveyor system includes a drive mechanism for moving the conveyor carriage along the conveyor course. This drive mechanism, for instance, may include an endlessly revolving drive unit assigned to the conveyor course, and at least one engagement element, which is capable of being brought into friction-locking (frictionally engaged) and/or form-locking engagement with the drive unit, is provided on the conveyor carriage. The drive unit, for instance, may be a flat-plate chain, a toothed belt, or some other suitable drive unit. What is essential, however, is that the drive mechanism makes it possible to create an accumulation of the conveyor carriages; that is, each individual conveyor carriage can interrupt its motion along the conveyor course if it approaches an obstacle, such as a separator. Alternatively, however, the conveyor carriage may be equipped with an electric motor, which is supplied by either batteries or accumulators, or is supplied with energy from the conveyor course, via wiper contacts or contactless energy transmission.

In some regions of the conveyor course, for instance in the region of branches or shunts or curves, it is advantageous if the conveyor carriage has at least two engagement elements, and each of the engagement elements is capable by itself of assuring the advancement of the conveyor carriage along the conveyor course. In this way, it is possible to interrupt the drive means in such regions, without interfering with the secure advancement of the conveyor carriage. If such an interruption of the drive means is intended, then the maximum possible curve radius R depends on the spacing D of the two engagement elements, in accordance with the following equation:

$$R = 0.5 \cdot \sqrt{2} \cdot D$$

If the drive mechanism is located between the two tracks in the upright direction, then the bearings of the drive unit can be relieved of any loading by the conveyor carriage.

If the axis of rotation of the support roller is pivotable about an axis extending substantially in the upright direction, preferably essentially parallel to the axis of rotation of the associated track roller, then it is assured that between the engagement element and the drive unit in the curve, the same engagement conditions prevail in travel straight ahead, so that along the entire conveyor course, a reliable drive of the conveyor carriage is assured.

In a refinement of the invention, it is proposed that the track rollers are both supported from above on the bracket-shaped mounting element. This support in fact makes it possible, in conjunction with a profile of the conveyor course that is open at the top, to place the conveyor carriage onto the conveyor course from above at any arbitrary point along the conveyor course.

DETAILED DESCRIPTION OF THE PREFERRED EMBODIMENTS

Figure 1:
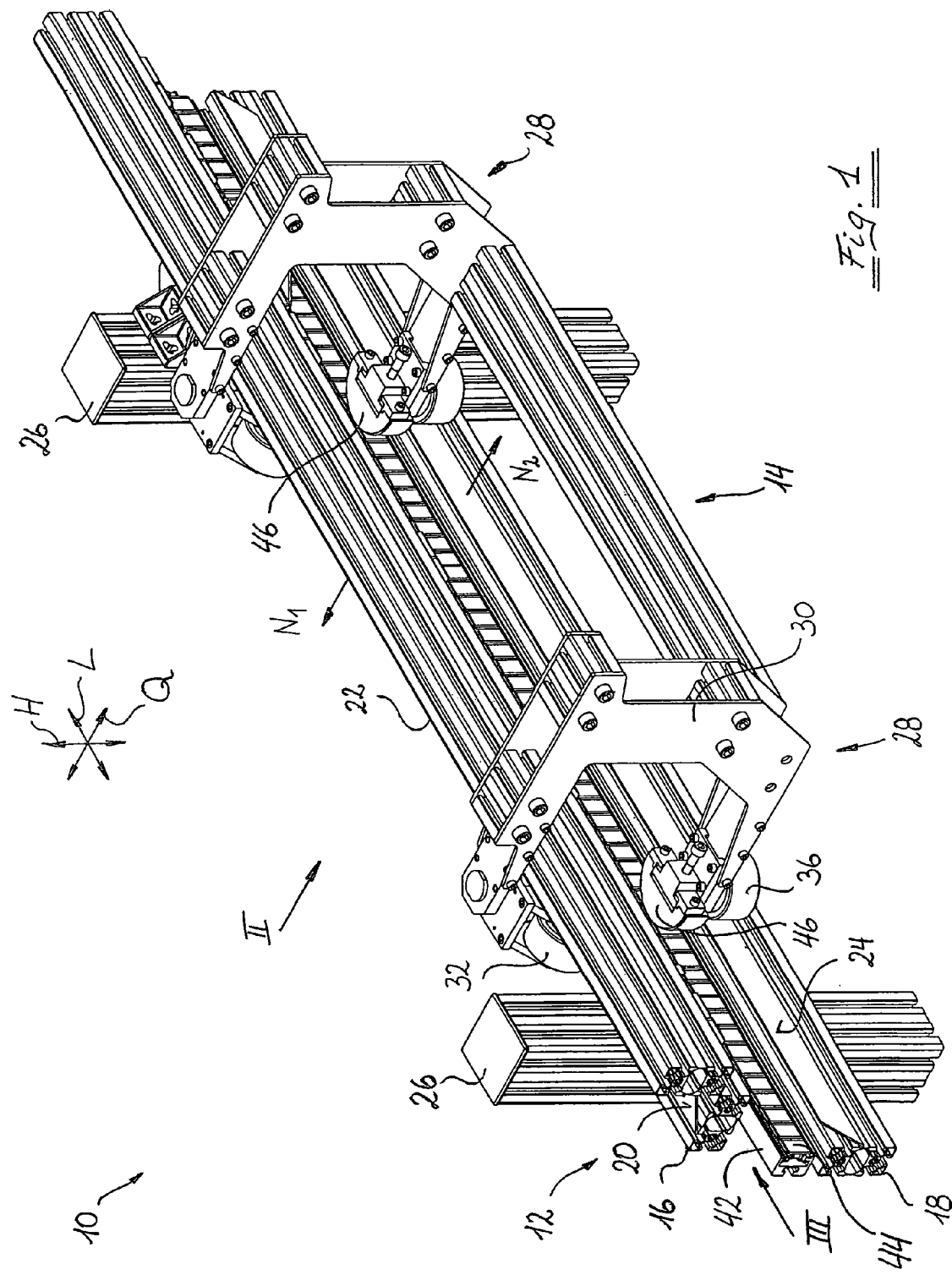
FIG. 1 is a perspective front view of a conveyor system of the invention.

In FIG. 1, a conveyor system of the invention is identified in general by reference numeral 10. It includes a conveyor course 12 and a conveyor carriage 14. It is self-evident that many such conveyor carriages 14 may move along the conveyor course 12.

The conveyor course 12 includes two profile element component groups or conveyor course units 16 and 18, embodied separately from one another, on which a plurality of tracks 20, 22 and 24 are provided (see also FIGS. 2 and 3), along which rollers (to be described hereinafter in further detail of the conveyor carriage 14) can move. The conveyor course units 16 and 18 are formed of lightweight metal profile elements, for instance aluminum profile elements, or assembled from such profile elements and are secured independently of one another on posts 26, which are likewise embodied as lightweight metal profile elements.

The conveyor carriage 14 includes two roller assemblies 28, which are spaced apart from one another in the longitudinal or conveying direction L. Each of these roller assemblies 28 includes one bracket-shape mounting unit 30, on which a support roller 32, an upper track roller 34 (see FIGS. 2 and 3), and a lower track roller 36 (see FIG. 3) are mounted rotatably. As shown in FIG. 3, a transport table 38 is also located on the bracket-shaped mounting units 30, and a load 40 represented by dashed lines in FIG. 3 can be placed on this table.

Since the load 40, via the conveyor carriage 14, is located laterally of the conveyor course 12, the weight load originating at it is for the most part carried onward to the conveyor course 12 in the form of a torque exerted by the conveyor carriage 14 on the conveyor course, and to a lesser extent also in the form of a weight force exerted by the conveyor carriage 14.

For carrying the aforementioned torque onward, the track 22 located on the upper conveyor course unit 16 and the track 24 located on the lower conveyor course unit 18 are both embodied with a track surface extending in the vertical direction H and the longitudinal direction L; the upper track 22 points toward the support elements 26, while the lower track 24 points away from the support elements. That is, the surface normals $N_1$ and $N_2$ of the tracks 22 and 24 both extend essentially in the crosswise direction Q, but point in opposite directions from one another.

The rollers 34 and 36 of the conveyor carriage 14 that are associated with these tracks 22 and 24 accordingly have a respective axis of rotation A and B, extending essentially in the upright direction H. Since in the view in FIG. 3, the upper track roller 34 rests from the left against the track 22, while the lower track roller 36 rests from the right against the track 24, the torque, originating in the load 40 and pointing clockwise in FIG. 3, can readily be transmitted to the tracks 22 and 24 of the conveyor course 12 via the rollers 34 and 36.

Moreover, the two track rollers 34, 36 are each supported from above on the bracket-shaped mounting unit 30; that is, in the view in FIG. 3, they are each located below the arms 30a and 30b of the bracket-shaped mounting unit 30. This support, in conjunction with the embodiment of the upper conveyor course unit 16 open at the top, makes it possible for the conveyor carriage 14 to be placed from above onto the conveyor course 12 at any arbitrary point along the conveyor course 12. It should furthermore be noted that the lower arm 30b of the bracket-shaped mounting unit 30 extends entirely above the lower conveyor course unit 18. This will be addressed again in conjunction with FIGS. 4 and 5.

The weight force of the load 40 that still remains is transmitted, via support rollers 32 that have an axis of rotation C extending essentially in the crosswise direction Q, to the support track 20 of the upper conveyor course unit 16. The support track extends not only in the longitudinal direction L but also essentially in the crosswise direction Q.

Figure 2:
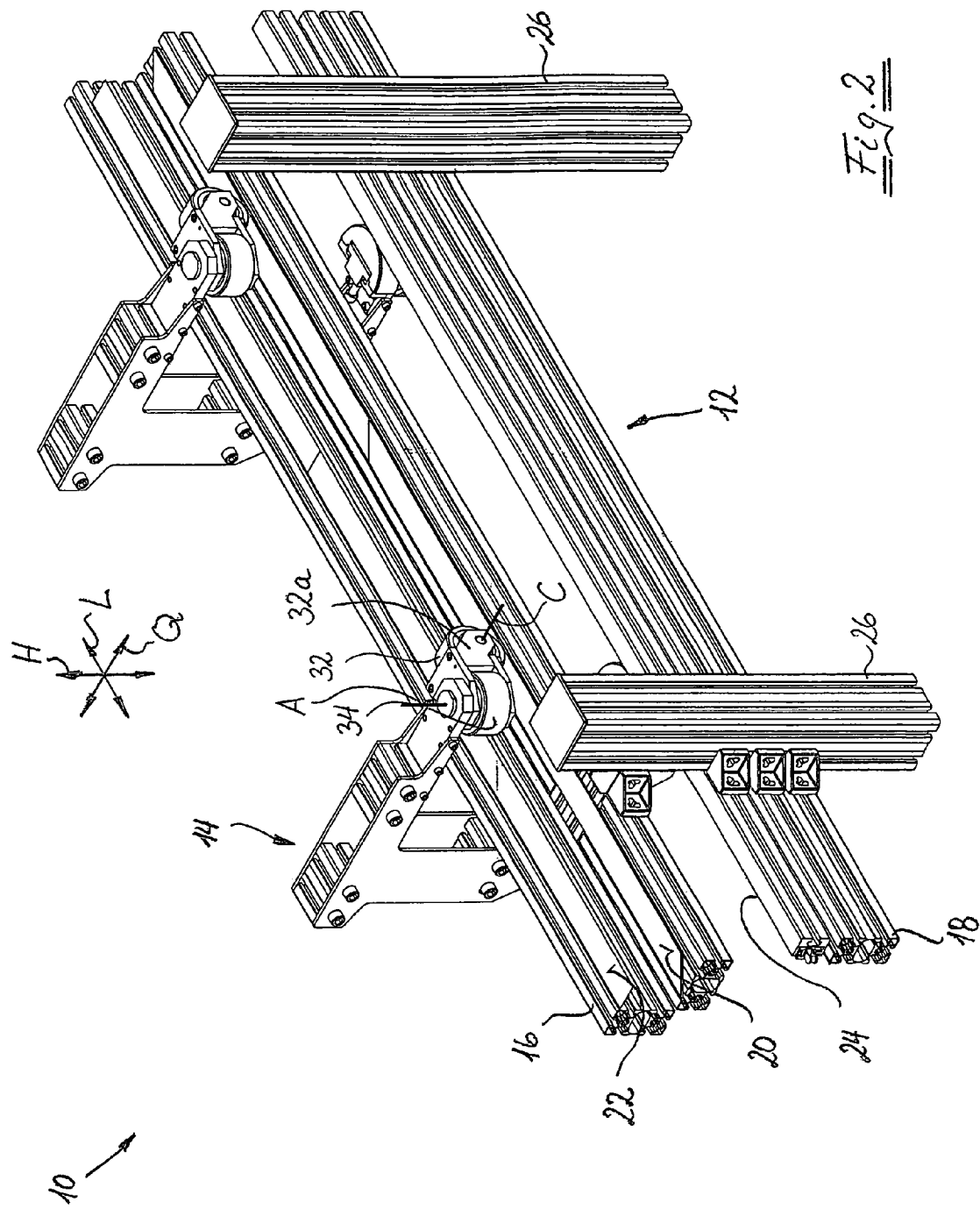
FIG. 2 is a perspective back view of the conveyor system of FIG. 1, seen in the direction of the arrow 11 in FIG. 1.
Figure 3:
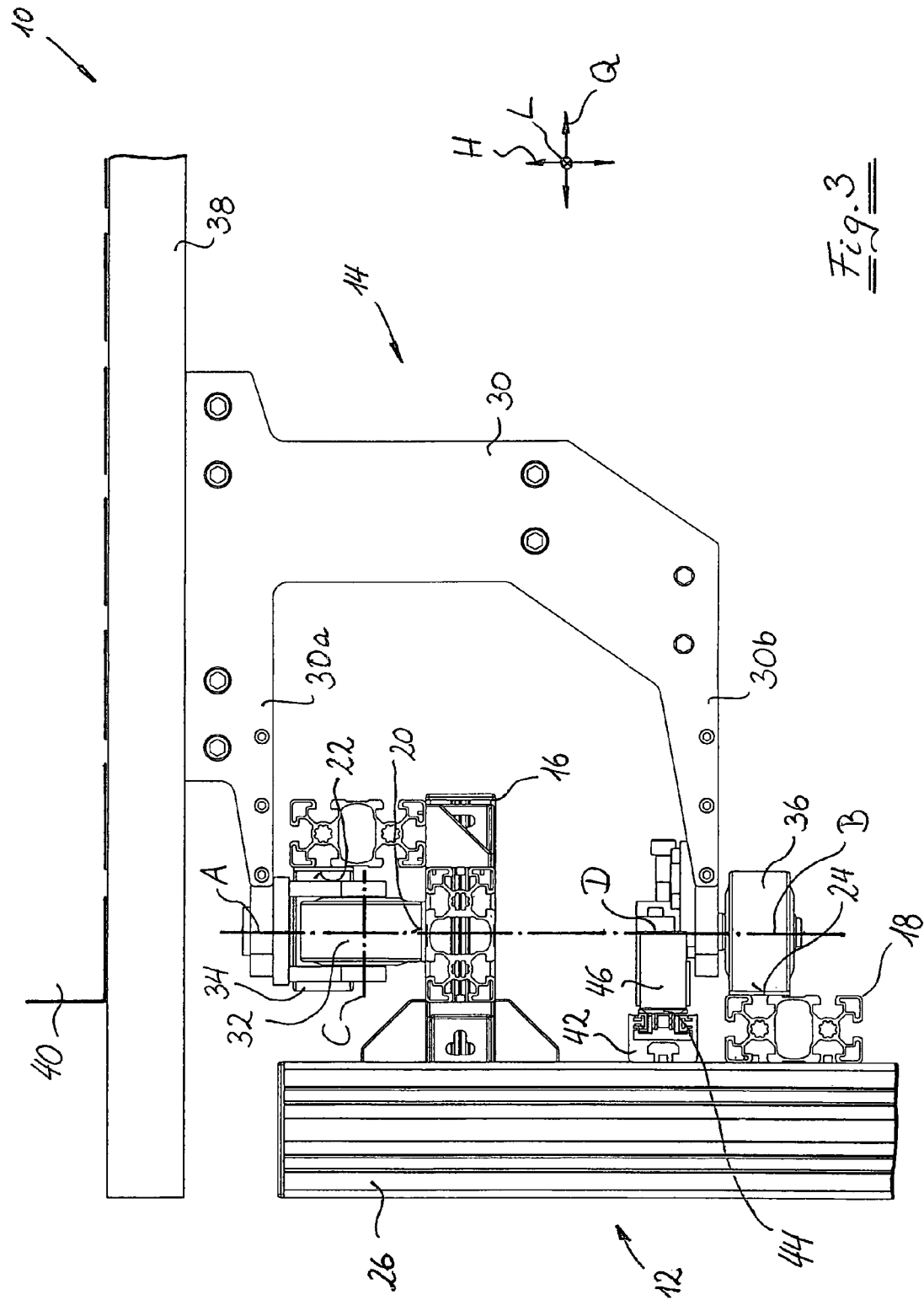
FIG. 3 is a side view of the conveyor system of FIG. 1, seen in the direction of the arrow III in FIG. 1.

As can be seen particularly well in FIG. 2, the support roller 32 is assigned as a trailing roller to the respective associated upper track roller 34; that is, a bearing element 32a rotatably supporting the axis of rotation C of the support roller 32 is in turn rotatably supported about the axis of rotation A of the track roller 34. At this point, it should also be remembered that the support roller 32, and the track rollers 34 and 36 as well, may be embodied not only as disk-type rollers with a fixed axis of rotation but also as ball rollers, whose actual axis of rotation in each case is established automatically as a consequence of the rolling engagement with the respective roller track.

According to the invention, the upper track roller 34 and the lower track roller 36 are located on the conveyor carriage 14 in such a way that their axes of rotation A and B extend in alignment with one another, as can be seen especially well in FIG. 3. Because of this aligned disposition of the axes of rotation A and B in the two roller assemblies 28 of the conveyor carriage 14, the conveyor carriage 14 has excellent cornering properties in curved portions 12A of the conveyor course 12 (see FIG. 4, for instance), since as a consequence of the aligned location of their axes of rotation A and B, both track rollers, namely the upper track roller 34 and the lower track roller 36, are always moving on the same curve radius. It is self-evident that this is true not only for a curved portion 12A in the region of a shunt assembly 50 but also quite generally in curved portions 12A, with which an axis of curvature that extends essentially in the upright direction H can be associated.

It should also be noted that in the upright direction H between the upper conveyor course unit 16 and the lower conveyor course unit 18, a profiled drive element 42 is secured to the posts 26. A drive element, for instance a flat-plate chain 44 known per se, runs within this profiled drive element 42. Moreover, each of the roller assemblies 28 of the conveyor carriage 14 has a slaving element 46, which is in friction-locking engagement with the flat-plate chain 44.

Alternatively, however, it is possible to provide a link chain as the drive element 44 that is in form-locking engagement with slaving elements 46 of the conveyor carriage 14. In each case, however, it must be assured that the slaving engagement between the drive element 44 and the slaving element 46 can be undone without problems, if the conveyor carriage 14 meets an obstacle, such as a separator.

As can be seen particularly from FIGS. 1 and 2, the slaving elements 46 are embodied with a round frictional engagement face and are located such that an axis D extending through the center of the rounding is likewise aligned with the axes of rotation A and B of the track rollers 34 and 36. As a result, even in curved portions of the route, a reliable slaving engagement can always be assured between the conveyor carriage 14 and the drive element 44.

Figure 4:
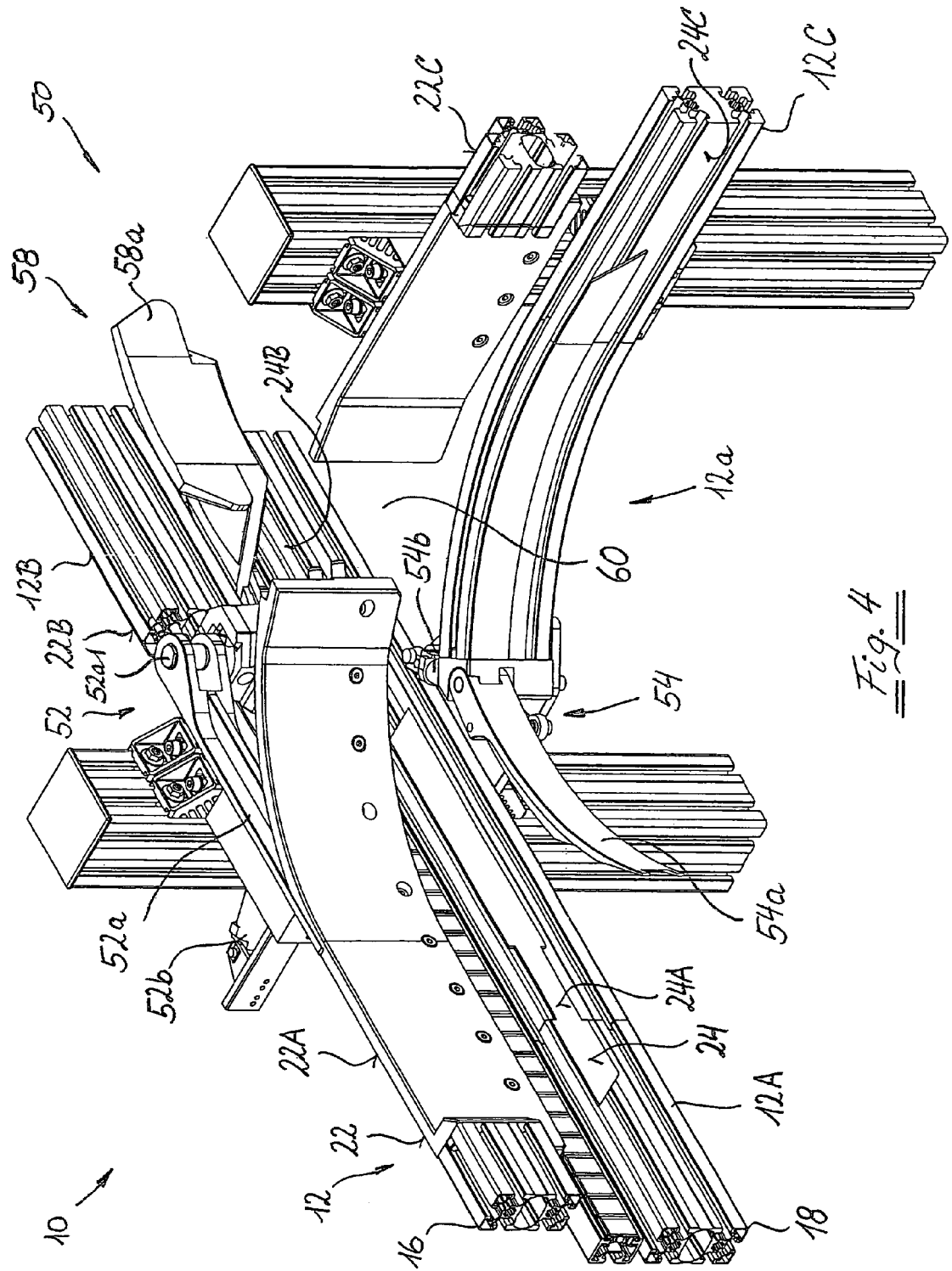
FIGS. 4 and 5 are perspective views of two different shunt positions of a shunt assembly of the conveyor system of the invention.
Figure 5:
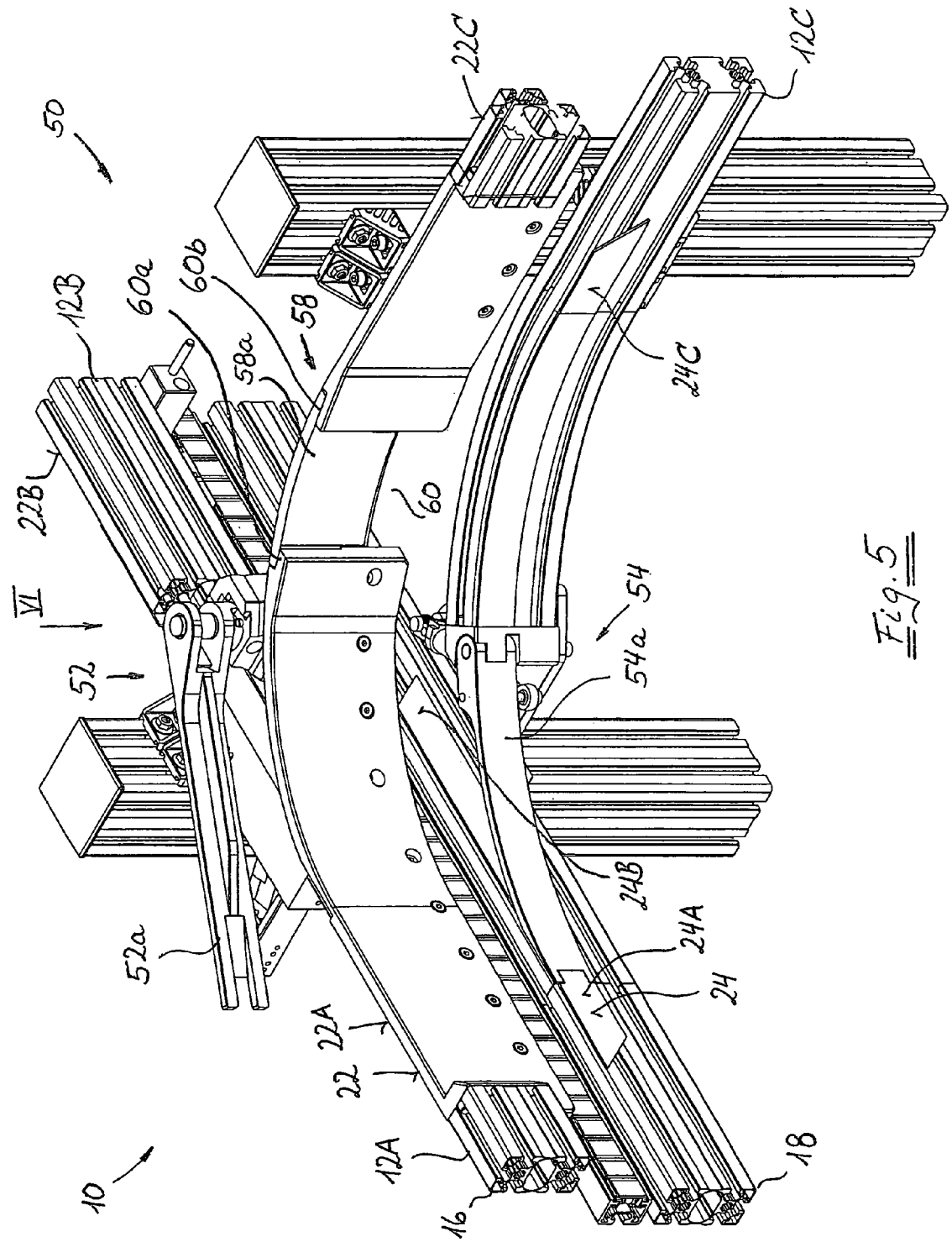

In FIGS. 4 and 5, a region of the conveyor course 12 of the conveyor system 10 of the invention is shown that is provided with a shunt assembly 50. In the shunt position of the shunt assembly 50 shown in FIG. 4, a conveyor carriage 14, arriving from a main path 12A of the conveyor course 12 is moved onward straight ahead to a first secondary path 12B, while in the shunt position shown in FIG. 5, it is turning toward a second secondary path 12C. In accordance with the main path 12A and the two secondary paths 12B and 12C of the conveyor course 12, the upper track 22 located on the upper conveyor course unit 16 has one main portion 22A and two secondary portions 22B and 22C, and lower track 24, located on the lower conveyor course unit 18, has one main portion 24A and two secondary portions 24B and 24C.

In the embodiment shown in FIGS. 4 and 5, each of the two tracks 22 and 24 is assigned its own respective shunt unit 52 and 54, which each have a movable shunt element 52a and 54a, respectively, and an associated actuator 52b and 54b, such as a fluidically actuatable cylinder-piston assembly. The actuators 52b and 54b are pivotably connected by one end to the associated conveyor course unit 16 and 18, respectively, and by their other end they are each pivotably connected to a lever 56 (see FIG. 6), connected to the pivot shaft 52a1 of the movable shunt element 51a, and directly to the movable shunt element 54a, respectively.

Moreover, the upper conveyor course unit 16, that is, the upper track 22, is assigned a further shunt unit 58, whose movable shunt element 58a, in the shunt position shown in FIG. 4, opens a through opening 60, provided in the track 22, for the bracket-shaped mounting unit 30 of the conveyor carriage 14, so that the conveyor carriage 14 can move without problems from the main path 12A of the conveyor course 12 to the first secondary path 12B of the conveyor course. In the shunt position shown in FIG. 5, the movable shunt element 58a conversely closes the through opening 60 and assures a continuous course of the upper track 22 from the main path 12A of the conveyor course 12 to the second secondary path 12C.

In this shunt position, the movable shunt element 58a is forced by the upper track roller 34 of the conveyor carriage 14 against two shoulder portions 60a and 60b of the through opening 60, which are embodied on the upper track 22 and introduce the forces, originating in the torque of the conveyor carriage 14, directly into the upper conveyor course unit 16. The actuator 52b, which not only assures the displacement of the movable shunt element 52a of the shunt unit 52 but is also simultaneously responsible for the displacement of the movable shunt element 58a of the further shunt unit 58, therefore need not be capable of withstanding the forces originating in the conveyor carriage 14 and can therefore be embodied as correspondingly less powerful and with a small structural size.

The movable shunt elements 52a and 54a are analogously embodied as self-locking. Specifically, the movable shunt element 52a, in the shunt position shown in FIG. 4, connecting the paths 12A and 12B of the conveyor course 12, presses against the main portion 22A of the upper track 22, while the movable shunt element 54a, in the shunt position shown in FIG. 5, in which the paths 12A and 12C of the conveyor course 12 are connected to one another, presses against the main portion 24A of the lower track 24. In both cases, the forces exerted by the respective track roller 34 and 36 are introduced directly into the upper conveyor course unit 16 and the lower conveyor course unit 18, respectively, and hence need not be absorbed by the respective actuators 52b and 54b.

It should also be pointed out that because of the fact that the lower arm 30b of the bracket-shaped mounting unit 30 extends entirely above the lower conveyor course unit 18 (see FIG. 3), no through opening corresponding to the through opening 60 of the upper conveyor course unit 16 and having an associated pass-through shunt unit needs to be provided in the lower conveyor course unit 18.

As has already been indicated above, the two movable shunt elements 52a and 58b are assigned a single common actuator 52b. However, it is readily apparent from a comparison of FIGS. 4 and 5 that the pivot angle by which the movable shunt element 52a must rotate about the pivot shaft 52a1 in order to enable to the upper track rollers 34 of the conveyor carriage 14 to pass from the main portion 22A of the upper track 22 to the secondary portion 22C, is considerably smaller than the pivot angle by which the movable shunt element 58a must rotate about the pivot shaft 52a1 in order to allow the bracket-shaped mounting units 30 of the conveyor carriage 14 to move from the main path 12A of the conveyor course 12 to the secondary path 12B.

Figure 6:
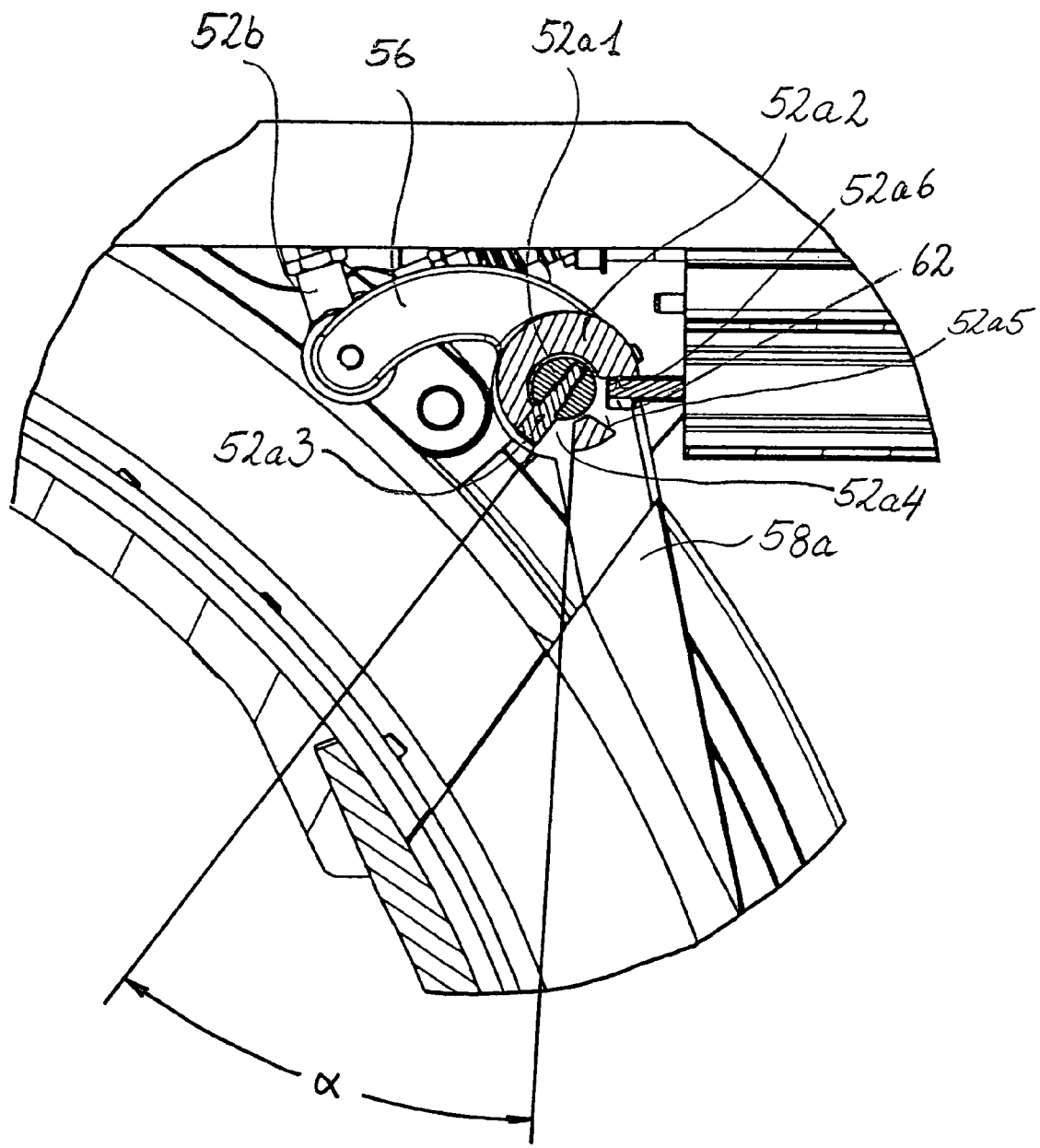
FIG. 6 is an enlarged fragmentary top view, in the direction of the arrow VI in FIG. 5, of an adjusting mechanism for adjusting movable shunt elements.

In FIG. 6, one possible embodiment is shown that makes these different pivot angles upon actuation possible by means of a single actuator 52b.

The pivot shaft 52a1 is connected to the actuator 52b via a lever 56 and can be pivoted back and forth by means of it over a predetermined pivot angle. The movable shunt element 58a is rigidly connected to this pivot shaft 52a1 and thus also executes the pivoting motion of the pivot shaft 52a1 over the entire pivot angle of this pivot shaft. Conversely, the movable shunt element 52a is supported rotatably on the pivot shaft 52a1 relative to it via a bearing bush 52a2. A pin 52a3, which is operationally fixedly connected to the pivot shaft 52a1, engages an oblong slot 52a4, extending in the circumferential direction of the bearing bush 52a2, specifically in such a way that upon pivoting of the pivot shaft 52a1 counterclockwise in terms of FIG. 6, only after traversing the pivot angle α does it enter the into contact with the bearing bush 52a2 and as a consequence then also carries along the movable shunt element 52a with it over the remaining pivoting course. Upon a rotation of the pivot shaft 52a1 clockwise in terms of FIG. 6 as well, the pin 52a3 first traverses the free angle α before it comes into contact and hence into slaving engagement with the bearing bush 52a2 of the movable shunt element 52a and then again carries it along over the further pivoting course.

The total pivot angle of the pivot shaft 52a1 and hence of the movable shunt element 58a is limited, upon counterclockwise pivoting in terms of FIG. 6, by the cooperation of a stop face 52a5 of the bearing bush 52a2 with a conveyor-course-specific stop element 62 and, upon pivoting clockwise, by the cooperation of a stop face 52a6 with the stop element 62.

Although this cannot be seen in the views shown in FIGS. 4 and 5, a portion of the support track 20 is also embodied on the movable shunt element 52a associated with the upper track 22.

It should also be noted that the roller tracks, namely the support track 20 and the tracks 22 and 24, may either be embodied directly as surfaces of the profile elements of the upper conveyor course unit 16 and lower conveyor course unit 18, or may be provided as separate roller track elements on these profile elements, as is shown in the drawings.

It will be understood that each of the elements described above, or two or more together, may also find a useful application in other types of constructions differing from the types described above.

While the invention has been illustrated and described herein as a conveyor system with a conveyor carriage with axially aligned track rollers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A conveyor system, comprising:
a conveyor course having at least one curved portion with an axis of curvature and a radius of curvature, wherein a conveying direction pointing along the conveyor course, an upright direction extending parallel to the axis of curvature, and a crosswise direction extending orthogonally to both the conveying direction and the upright direction are associated with this conveyor course, wherein the conveyor course has an upper track and a lower track, said upper and lower tracks being positioned one above the other in the upright direction and extending at a predetermined spacing from one another; wherein the upper track has a track face with a surface normal pointing in a first crosswise direction;
wherein the lower track has a track face with a surface normal pointing in a second crosswise direction opposite to said first cross wise direction;
a conveyor carriage having at least three rollers, wherein at least one track roller having an axis of rotation extending substantially in the upright direction is assigned to each of the tracks, and wherein at least one of the tracks is assigned a further track roller with an axis of rotation extending substantially in the upright direction, wherein said axis is spaced apart in the conveying direction from the one track roller associated with the same track; and wherein, among the at least three rollers, an upper track roller is in rolling engagement with said track face of said upper track and a lower track roller is in rolling engagement with said track face of said lower track;

wherein the axis of rotation of said upper track roller is aligned on the same line with the axis of rotation of said lower track roller; and, whenever the two tracks are each assigned a further track roller, the axes of rotation of these further track rollers are likewise located in alignment with one another, wherein the two tracks are embodied on track units that are embodied separately from one another.

2. The conveyor system as recited in claim 1, wherein the two track units are capable of being secured to one common, higher-order mounting unit.

3. The conveyor system as recited in claim 1 further including a drive mechanism for moving the conveyor carriage along the conveyor course.

4. The conveyor system as recited in claim 1, wherein at least one support roller is provided.

5. The conveyor system as recited in claim 4, wherein the at least one support roller is associated as a trailing roller with one of the track rollers.

6. The conveyor system as recited in claim 5, wherein the at least one support roller is dimensioned such that it is capable of being located in the upright direction such that it is substantially completely below the track roller assigned to it.

7. The conveyor system as recited in claim 4, wherein the axis of rotation of the at least one support roller is pivotable about an axis extending substantially in the upright direction.

8. The conveyor system as recited in claim 7, wherein the support roller is dimensioned such that it is capable of pivoting 360° on the roller track assigned to it.

9. The conveyor system as recited in claim 1, wherein at least one of the rollers is embodied as a disk-type roller.

10. The conveyor system as recited in claim 1, wherein at least one of the rollers is embodied as a ball roller.

11. The conveyor system as recited in claim 1, wherein the surface of at least one track is formed of lightweight metal or a lightweight metal alloy, and wherein the surface of at least one track roller is formed of a plastic, whose hardness preferably does not exceed 100 Shore A.

12. The conveyor system as recited in claim 11, wherein the metal is aluminum or an aluminum alloy and the plastic is polyurethane.

13. A conveyor system, comprising:
a conveyor course having at least one curved portion with an axis of curvature and a radius of curvature, wherein a conveying direction pointing along the conveyor course, an upright direction extending parallel to the axis of curvature, and a crosswise direction extending orthogonally to both the conveying direction and the upright direction are associated with this conveyor course, wherein the conveyor course has an upper track and a lower track, said upper and lower tracks being positioned one above the other in the upright direction and extending at a predetermined spacing from one another; wherein the upper track has a track face with a surface normal pointing in a first crosswise direction;
wherein the lower track has a track face with a surface normal pointing in a second crosswise direction opposite to said first cross wise direction;
a conveyor carriage having at least three rollers, wherein at least one track roller having an axis of rotation extending substantially in the upright direction is assigned to each of the tracks, and wherein at least one of the tracks is assigned a further track roller with an axis of rotation extending substantially in the upright direction, wherein said axis is spaced apart in the conveying direction from the one track roller associated with the same track; and
wherein, among the at least three rollers, an upper track roller is in rolling engagement with said track face of said upper track and a lower track roller is in rolling engagement with said track face of said lower track;
wherein the axis of rotation of said upper track roller is aligned on the same line with the axis of rotation of said lower track roller; and, whenever the two tracks are each assigned a further track roller, the axes of rotation of these further track rollers are likewise located in alignment with one another,
further including a drive mechanism for moving the conveyor carriage along the conveyor course,
wherein an endlessly revolving drive unit is assigned to the conveyor course, and at least one engagement element capable of being brought into frictionally engaged and/or form-locking engagement with the drive unit is provided on the conveyor carriage.

14. The conveyor system as recited in claim 13, wherein the at least one engagement element is round and is located on the conveyor carriage, such that an axis extending through the center of the rounding is in alignment with the axes of rotation of two track rollers associated with one another.

15. A conveyor system, comprising:
a conveyor course having at least one curved portion with an axis of curvature and a radius of curvature, wherein a conveying direction pointing along the conveyor course, an upright direction extending parallel to the axis of curvature, and a crosswise direction extending orthogonally to both the conveying direction and the upright direction are associated with this conveyor course, wherein the conveyor course has an upper track and a lower track, said upper and lower tracks being positioned one above the other in the upright direction and extending at a predetermined spacing from one another; wherein the upper track has a track face with a surface normal pointing in a first crosswise direction;
wherein the lower track has a track face with a surface normal pointing in a second crosswise direction opposite to said first cross wise direction;
a conveyor carriage having at least three rollers, wherein at least one track roller having an axis of rotation extending substantially in the upright direction is assigned to each of the tracks, and wherein at least one of the tracks is assigned a further track roller with an axis of rotation extending substantially in the upright direction, wherein said axis is spaced apart in the conveying direction from the one track roller associated with the same track; and
wherein, among the at least three rollers, an upper track roller is in rolling engagement with said track face of said upper track and a lower track roller is in rolling engagement with said track face of said lower track;
wherein the axis of rotation of said upper track roller is aligned on the same line with the axis of rotation of said lower track roller; and, whenever the two tracks are each assigned a further track roller, the axes of rotation of these further track rollers are likewise located in alignment with one another,
further including a drive mechanism for moving the conveyor carriage along the conveyor course,
wherein the drive mechanism is located between the two tracks in the upright direction.

16. A conveyor system, comprising:
a conveyor course having at least one curved portion with an axis of curvature and a radius of curvature, wherein a conveying direction pointing along the conveyor course, an upright direction extending parallel to the axis of curvature, and a crosswise direction extending orthogonally to both the conveying direction and the upright direction are associated with this conveyor course, wherein the conveyor course has an upper track and a lower track, said upper and lower tracks being positioned one above the other in the upright direction and extending at a predetermined spacing from one another; wherein the upper track has a track face with a surface normal pointing in a first crosswise direction;

wherein the lower track has a track face with a surface normal pointing in a second crosswise direction opposite to said first cross wise direction;

a conveyor carriage having at least three rollers, wherein at least one track roller having an axis of rotation extending substantially in the upright direction is assigned to each of the tracks, and wherein at least one of the tracks is assigned a further track roller with an axis of rotation extending substantially in the upright direction, wherein said axis is spaced apart in the conveying direction from the one track roller associated with the same track; and wherein, among the at least three rollers, an upper track roller is in rolling engagement with said track face of said upper track and a lower track roller is in rolling engagement with said track face of said lower track;

wherein the axis of rotation of said upper track roller is aligned on the same line with the axis of rotation of said lower track roller; and, whenever the two tracks are each assigned a further track roller, the axes of rotation of these further track rollers are likewise located in alignment with one another, wherein at least one support roller is provided, wherein said at least one support roller has an axis of rotation extending substantially in the crosswise direction.

17. A conveyor system, comprising:

a conveyor course having at least one curved portion with an axis of curvature and a radius of curvature, wherein a conveying direction pointing along the conveyor course, an upright direction extending parallel to the axis of curvature, and a crosswise direction extending orthogonally to both the conveying direction and the upright direction are associated with this conveyor course, wherein the conveyor course has an upper track and a lower track, said upper and lower tracks being positioned one above the other in the upright direction and extending at a predetermined spacing from one another; wherein the upper track has a track face with a surface normal pointing in a first crosswise direction;

wherein the lower track has a track face with a surface normal pointing in a second crosswise direction opposite to said first cross wise direction;

a conveyor carriage having at least three rollers, wherein at least one track roller having an axis of rotation extending substantially in the upright direction is assigned to each of the tracks, and wherein at least one of the tracks is assigned a further track roller with an axis of rotation extending substantially in the upright direction, wherein said axis is spaced apart in the conveying direction from the one track roller associated with the same track; and wherein, among the at least three rollers, an upper track roller is in rolling engagement with said track face of said upper track and a lower track roller is in rolling engagement with said track face of said lower track;

wherein the axis of rotation of said upper track roller is aligned on the same line with the axis of rotation of said lower track roller; and, whenever the two tracks are each assigned a further track roller, the axes of rotation of these further track rollers are likewise located in alignment with one another, wherein at least one support roller is provided, wherein the axis of rotation of the at least one support roller is pivotable about an axis extending substantially in the upright direction, wherein the axis of rotation of the at least one support roller is pivotable about an axis extending substantially parallel to the axis of rotation of the associated track roller.

18. A conveyor system, comprising:

a conveyor course having at least one curved portion with an axis of curvature and a radius of curvature, wherein a conveying direction pointing along the conveyor course, an upright direction extending parallel to the axis of curvature, and a crosswise direction extending orthogonally to both the conveying direction and the upright direction are associated with this conveyor course, wherein the conveyor course has an upper track and a lower track, said upper and lower tracks being positioned one above the other in the upright direction and extending at a predetermined spacing from one another; wherein the upper track has a track face with a surface normal pointing in a first crosswise direction;

wherein the lower track has a track face with a surface normal pointing in a second crosswise direction opposite to said first cross wise direction;

a conveyor carriage having at least three rollers, wherein at least one track roller having an axis of rotation extending substantially in the upright direction is assigned to each of the tracks, and wherein at least one of the tracks is assigned a further track roller with an axis of rotation extending substantially in the upright direction, wherein said axis is spaced apart in the conveying direction from the one track roller associated with the same track; and wherein, among the at least three rollers, an upper track roller is in rolling engagement with said track face of said upper track and a lower track roller is in rolling engagement with said track face of said lower track;

wherein the axis of rotation of said upper track roller is aligned on the same line with the axis of rotation of said lower track roller; and, whenever the two tracks are each assigned a further track roller, the axes of rotation of these further track rollers are likewise located in alignment with one another, wherein the surface of at least one track is formed of lightweight metal or a lightweight metal alloy, and wherein the surface of at least one track roller is formed of a plastic, whose hardness preferably does not exceed 100 Shore A.

19. The conveyor system as recited in claim 18, wherein at least one support roller is provided.

20. The conveyor system as recited in claim 19, wherein the at least one support roller is associated as a trailing roller with one of the track rollers.

21. The conveyor system as recited in claim 20, wherein the at least one support roller is dimensioned such that it is capable of being located in the upright direction such that it is substantially completely below the track roller assigned to it.

22. The conveyor system as recited in claim 19, wherein the axis of rotation of the at least one support roller is pivotable about an axis extending substantially in the upright direction.

23. The conveyor system as recited in claim 22, wherein the support roller is dimensioned such that it is capable of pivoting 360° on the roller track assigned to it.

24. The conveyor system as recited in claim 22, wherein the axis of rotation of the at least one support roller is pivotable about an axis extending substantially parallel to the axis of rotation of the associated track roller.

25. The conveyor system as recited in claim 19, wherein said at least one support roller has an axis of rotation extending substantially in the crosswise direction.

26. The conveyor system as recited in claim 18, wherein at least one of the rollers is embodied as a disk-type roller.

27. The conveyor system as recited in claim 18, wherein at least one of the rollers is embodied as a ball roller.

28. The conveyor system as recited in claim 18, wherein track faces of the two tracks point in opposite directions.

29. The conveyor system as recited in claim 18, wherein the two tracks are embodied on track units that are embodied separately from one another.

30. The conveyor system as recited in claim 29, wherein the two track units are capable of being secured to one common, higher-order mounting unit.

31. The conveyor system as recited in claim 18, further including a drive mechanism for moving the conveyor carriage along the conveyor course.

32. The conveyor system as recited in claim 31, wherein an endlessly revolving drive unit is assigned to the conveyor course, and at least one engagement element capable of being brought into frictionally engaged and/or form-locking engagement with the drive unit is provided on the conveyor carriage.

33. The conveyor system as recited in claim 31, wherein the drive mechanism is located between the two tracks in the upright direction.

34. The conveyor system as recited in claim 32, wherein the at least one engagement element is round and is located on the conveyor carriage, such that an axis extending through the center of the rounding is in alignment with the axes of rotation of two track rollers associated with one an other.

35. The conveyor system as recited in claim 18, wherein the metal is aluminum or an aluminum alloy and the plastic is polyurethane.

* * * * *